(12) United States Patent
Battiprolu et al.

(10) Patent No.: US 11,144,369 B2
(45) Date of Patent: Oct. 12, 2021

(54) PREEMPTIVE SELF-HEALING OF APPLICATION SERVER HANGING THREADS

(71) Applicant: Bank of America Corporation, Charlotte, NC (US)

(72) Inventors: Vijay Kumar Battiprolu, Hyderabad (IN); Rajesh Babu Vanamala, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 187 days.

(21) Appl. No.: 16/730,734

(22) Filed: Dec. 30, 2019

(65) Prior Publication Data

US 2021/0200603 A1 Jul. 1, 2021

(51) Int. Cl.
*G06F 9/52* (2006.01)
*G06F 11/34* (2006.01)
*G06F 9/48* (2006.01)
*G06F 16/11* (2019.01)

(52) U.S. Cl.
CPC ............ *G06F 9/524* (2013.01); *G06F 9/4881* (2013.01); *G06F 11/3495* (2013.01); *G06F 16/128* (2019.01); *G05B 2219/40204* (2013.01); *G06F 2201/81* (2013.01); *G06F 2201/84* (2013.01)

(58) Field of Classification Search
CPC ............ G06F 11/3495; G06F 2201/81; G06F 2201/84; G06F 9/4881; G06F 9/524; G06F 17/30088; G06F 16/128; G05B 2219/40204
See application file for complete search history.

(56) References Cited

U.S. PATENT DOCUMENTS

| | | | |
|---|---|---|---|
| 6,259,960 B1 | 7/2001 | Inokuchi | |
| 7,516,292 B2 | 4/2009 | Kimura et al. | |
| 7,530,072 B1 * | 5/2009 | Cheaz | G06F 9/5027 718/104 |
| 7,536,274 B2 | 5/2009 | Heavner, III et al. | |
| 7,836,366 B2 | 11/2010 | Sharma et al. | |
| 7,912,695 B2 | 3/2011 | Krishnamurthy et al. | |
| 8,341,473 B2 | 12/2012 | Bertacco et al. | |
| 8,499,287 B2 | 7/2013 | Shafi et al. | |
| 8,615,695 B2 | 12/2013 | Guo et al. | |

(Continued)

*Primary Examiner* — Jorge A Chu Joy-Davila
(74) *Attorney, Agent, or Firm* — Michael A. Springs

(57) ABSTRACT

A system includes an application server, a memory, and a processor. The application server runs one or more software threads. The memory stores snapshots of the system performance of the application server taken at periodic time intervals, a repository of previous stuck thread scenarios, and a plurality of thread healing scripts. The processor monitors server performance parameters, determines that a thread running on the application server is stuck, retrieves a set of snapshots of the system performance taken before the moment when it was determined that the thread is stuck, identifies from among the retrieved set of snapshots the oldest snapshot with a server performance parameter that exceeds a threshold, compares the server performance parameters in the identified oldest snapshot with the repository of previous stuck thread scenarios to identify a closest match, identifies a script for resolving the matched stuck thread scenario, and executes the identified script.

20 Claims, 3 Drawing Sheets

(56) References Cited

U.S. PATENT DOCUMENTS

| | | |
|---|---|---|
| 8,706,297 B2 | 4/2014 | Letsky |
| 9,264,399 B1* | 2/2016 | Schryver .............. H04L 63/101 |
| 9,317,330 B2 | 4/2016 | Duttagupta et al. |
| 9,495,199 B2 | 11/2016 | Slinger et al. |
| 9,495,395 B2 | 11/2016 | Chan et al. |
| 9,547,766 B2 | 1/2017 | Turgeman et al. |
| 9,621,567 B2 | 4/2017 | Turgeman et al. |
| 9,690,915 B2 | 6/2017 | Turgeman et al. |
| 9,692,662 B2 | 6/2017 | Chan et al. |
| 9,721,418 B2 | 8/2017 | van Ooyen et al. |
| 9,838,373 B2 | 12/2017 | Turgeman |
| 10,055,560 B2 | 8/2018 | Turgeman |
| 10,102,586 B1 | 10/2018 | Marlow et al. |
| 10,223,753 B1 | 3/2019 | Marlow et al. |
| 10,323,948 B2 | 6/2019 | Kitchel et al. |
| 10,474,815 B2 | 11/2019 | Turgeman |
| 10,489,245 B2 | 11/2019 | Berger et al. |
| 10,891,366 B1* | 1/2021 | Wu ....................... H04L 9/0894 |
| 11,080,125 B1* | 8/2021 | Raj ..................... G06F 11/0778 |
| 2004/0250189 A1* | 12/2004 | Smith ..................... G06F 9/524 714/741 |
| 2005/0028157 A1* | 2/2005 | Betancourt ............ G06F 11/366 718/100 |
| 2005/0197805 A1 | 9/2005 | Eryurek et al. |
| 2005/0267709 A1 | 12/2005 | Hevner, III et al. |
| 2007/0220513 A1* | 9/2007 | Hwang .................. G06F 9/524 718/1 |
| 2008/0027591 A1 | 1/2008 | Lenser et al. |
| 2010/0031084 A1* | 2/2010 | Tremblay .............. G06F 9/3005 714/13 |
| 2011/0179398 A1* | 7/2011 | Peterson ............. G06F 11/2097 717/115 |
| 2013/0086010 A1 | 4/2013 | Wenzel et al. |
| 2014/0089734 A1* | 3/2014 | Busaba ................ G06F 11/2043 714/16 |
| 2014/0310714 A1* | 10/2014 | Chan ..................... G06F 9/4881 718/102 |
| 2014/0317744 A1 | 10/2014 | Turgeman et al. |
| 2014/0325223 A1 | 10/2014 | Turgeman et al. |
| 2014/0325646 A1 | 10/2014 | Turgeman et al. |
| 2014/0325682 A1 | 10/2014 | Turgeman et al. |
| 2015/0207948 A1 | 7/2015 | Yamaguchi |
| 2015/0309813 A1 | 10/2015 | Patel |
| 2016/0182328 A1* | 6/2016 | Bhasin ................. H04L 43/067 709/224 |
| 2017/0147422 A1* | 5/2017 | Koktan ............... G06F 11/0724 |
| 2017/0193526 A1 | 7/2017 | Turgeman et al. |
| 2018/0231533 A1 | 8/2018 | Holmes et al. |
| 2018/0342050 A1 | 11/2018 | Fitzgerald et al. |
| 2018/0349583 A1 | 12/2018 | Turgeman et al. |
| 2019/0096057 A1 | 3/2019 | Allen et al. |
| 2019/0129818 A1 | 5/2019 | Kannan et al. |
| 2019/0205123 A1* | 7/2019 | Wang .................. G06F 11/3624 |
| 2020/0125385 A1* | 4/2020 | Kotecha .............. G06F 11/3442 |
| 2021/0081300 A1* | 3/2021 | Hegde ................. G06F 11/3636 |

* cited by examiner

PREEMPTIVE SELF-HEALING OF APPLICATION SERVER HANGING THREADS

TECHNICAL FIELD

This disclosure relates generally to application server maintenance. More specifically, this disclosure relates to detecting and correcting hanging threads.

BACKGROUND

An application server can simultaneously execute several tasks, known as threads. A thread that performs the same request for an extended period of time is considered a stuck thread. Stuck threads are problematic for middleware because they consume computing resources—processing power, memory, etc.—and slow down the execution of other threads. Detection and resolution of stuck threads is complicated by the myriad of possible causes. For example, stuck threads may result from administrative backup jobs running concurrently, memory fragmentation, or lack of disk space. Each cause may require a different operation to fix the stuck thread. With the stuck thread persisting until a solution is implemented, middleware operation can come to a standstill without accurate diagnosis and repair.

SUMMARY OF THE DISCLOSURE

Stuck thread scenarios consume scarce computing resources if not dealt with quickly. This can lead to crashes of critical middleware applications.

This disclosure contemplates a tool that improves the operation of application threads on a server by predicting stuck thread scenarios in a middleware application and self-healing based on the predictions. According to one embodiment, a method includes taking, by a hardware processor communicatively coupled to a memory, snapshots of an application server's performance parameters at periodic time intervals. The snapshots generally include the status of a plurality of performance parameters. The method also includes determining, by the processor, that a thread running on the application server is stuck when it has been working on a request for more than a configured maximum time. The method further includes retrieving, by the processor, a set of snapshots, from the memory, of the system performance taken during a period of time preceding the moment when it was determined that the thread running on the application server is stuck. The method also includes identifying, by the processor, the oldest snapshot from among the retrieved set of snapshots that has a performance parameter that exceeds a threshold. The method further includes comparing, by the processor, the server performance parameters comprising the oldest snapshot with a repository of previous stuck thread scenarios to identify a match. The stuck thread scenarios comprise the snapshots of the system performance taken when the thread has been working on a request for more than a configured maximum time. The method also includes identifying, by the processor, a script, from a database of solutions to the previous stuck thread scenarios, with the instructions for resolving the matched stuck thread scenario. The method also includes executing, by the processor, the identified script.

According to another embodiment, a system includes an application server, a memory, and a processor. The application server runs one or more software threads. The memory stores snapshots, taken at periodic time intervals, of the system performance of the application server. The snapshots include the status of a plurality of server performance parameters. The memory further stores a repository of previous stuck thread scenarios. Each stuck thread scenario comprises the snapshot of the system performance taken when the thread became stuck. A thread is stuck when it works on a request for more than a configured maximum time. The memory further stores a plurality of thread healing scripts, which are instructions for resolving a stuck thread scenario. The processor monitors the plurality of server performance parameters and determines that a thread running on the application server is stuck when it has been working on a request for more than a configured maximum time. The processor further retrieves, from the memory, a set of snapshots of the system performance taken during a period of time preceding the moment when it was determined that the thread running on the application server is stuck. Additionally, the processor identifies from among the retrieved set of snapshots the oldest snapshot with a server performance parameter that exceeds a threshold. The processor further compares the server performance parameters comprising the oldest snapshot with the repository of previous stuck thread scenarios to identify a closest match. Additionally, the processor identifies a script with the instructions for resolving the matched stuck thread scenario. The processor also executes the identified script.

According to yet another embodiment, an apparatus includes a memory and a processor. The memory stores snapshots of an application server's performance that are taken at periodic intervals. The snapshots include a status of a plurality of server performance parameters. The memory further stores a repository of previous stuck thread scenarios. The repository of stuck thread scenarios includes a snapshot of the system performance taken when the thread has been working on a request for more than a configured maximum time. The memory further stores a plurality of thread healing scripts, which are a set of instructions for resolving a stuck thread scenario. The processor monitors the plurality of server performance parameters and determines that a thread running on the application server is stuck when it has been working on a request for more than a configured maximum time. The processor also retrieves a set of snapshots of the system performance taken for a period of time preceding the moment when it was determined that the thread running on the application server is stuck. The processor additionally identifies from among the retrieved set of snapshots the oldest snapshot with a server parameter that exceeds a threshold. The processor also compares the server performance parameters comprising the oldest snapshot with the repository of previous stuck thread scenarios to identify a closest match. The processor additionally identifies a script with the instructions for resolving the matched stuck thread scenario and executes the script.

Certain embodiments provide one or more technical advantages. For example, the system described in the present disclosure may be integrated into a practical application of a stuck-thread detection and remediation system, which may improve application server performance by detecting stuck threads early and applying an accurate solution to the problem. This improves overall network function because the processing power consumed by a stuck thread has cascading effects throughout a network. Other processes running on the server slow or stall and create a network bottleneck. As yet another example, an embodiment updates a heuristics database to link healing scripts with a set of performance parameters that caused a stuck thread. The mapping of this data further reduces the amount of time necessary to resolve a stuck thread by enabling the system to predict solutions to future stuck thread scenarios. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
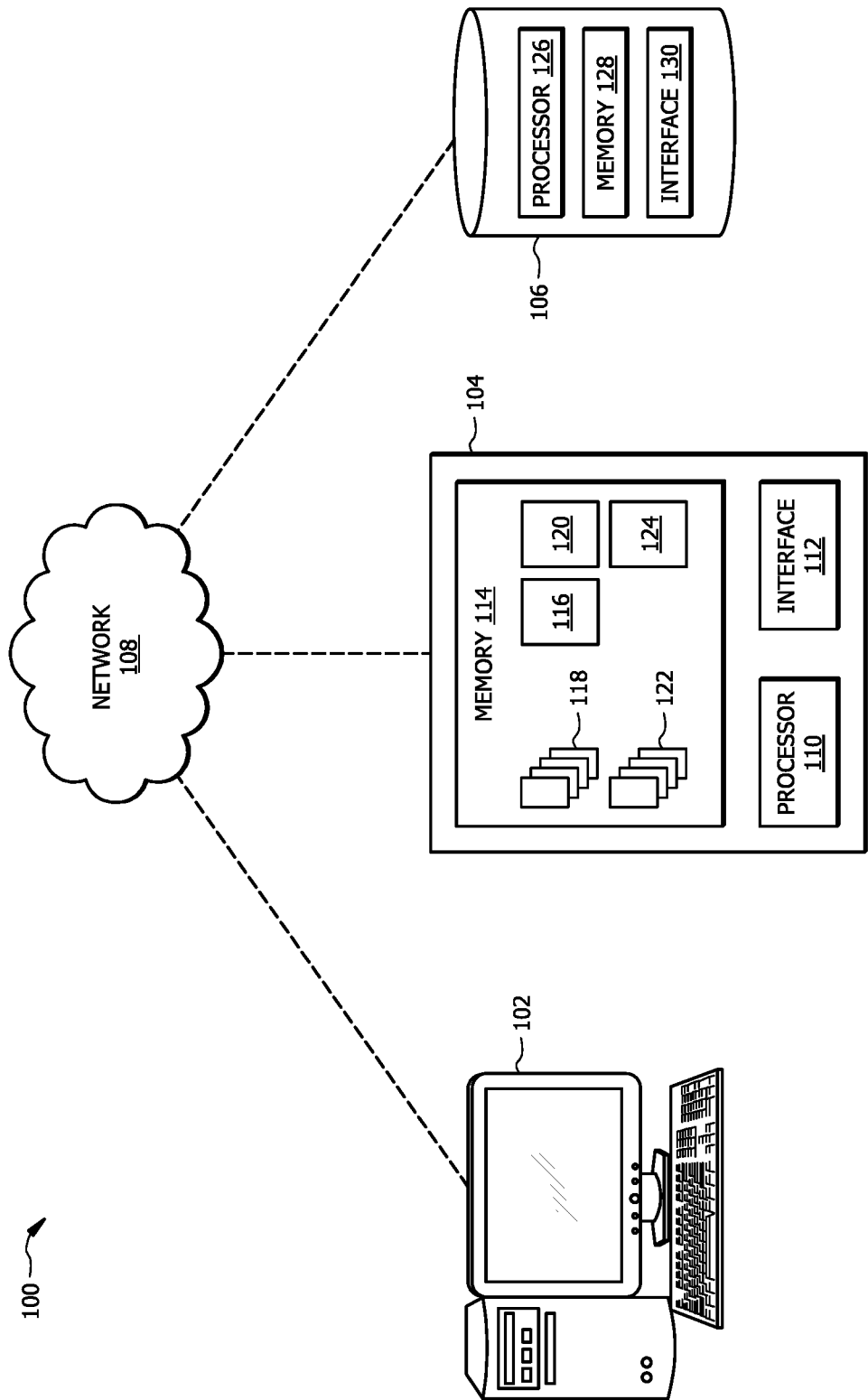
FIG. 1 illustrates an example system.
Figure 2:
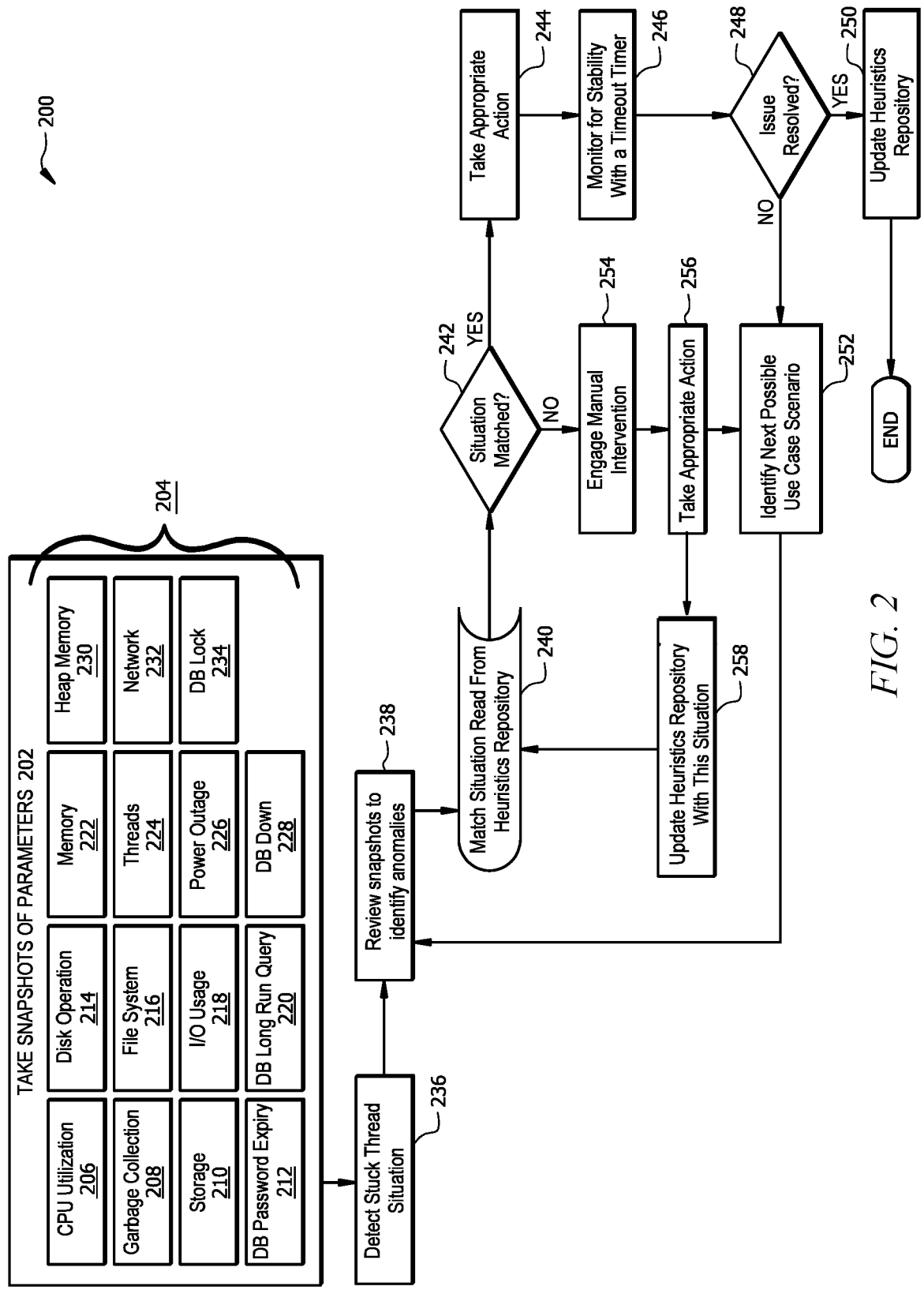
FIG. 2 is a flowchart illustrating a method for detecting and correcting hanging threads in the system of FIG. 1.
Figure 3:
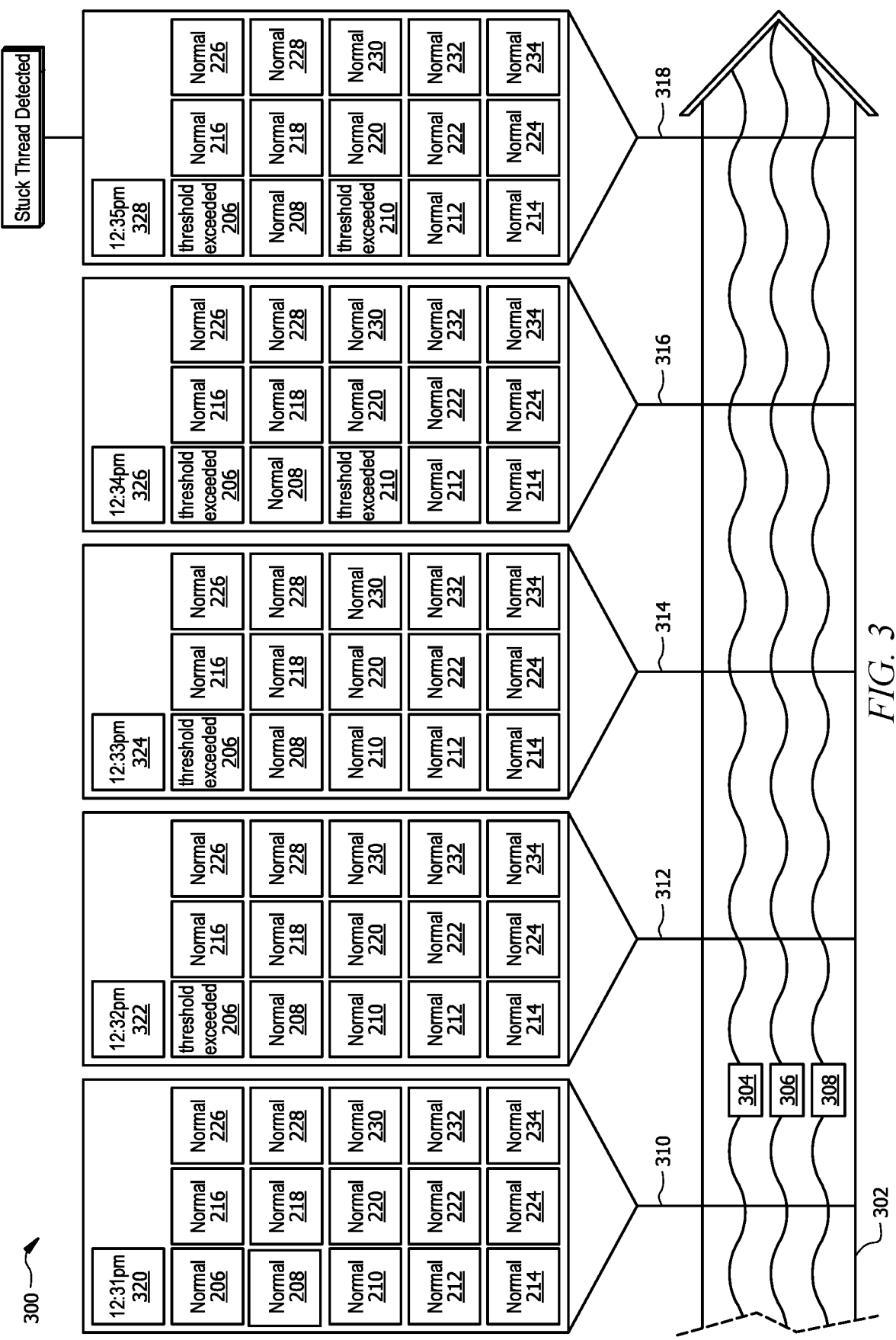
FIG. 3 illustrates the monitoring and anomaly identification steps of the method in FIG. 2.

Embodiments of the present disclosure and its advantages are best understood by referring to FIGS. 1-3 of the drawings, like numerals being used for like and corresponding parts of the various drawings.

FIG. 1 depicts an example system for preemptively healing hanging threads on an application server. The system 100 comprises a user device 102, application server 104, and database server 106. The components of system 100 are communicatively coupled through network 108. User device 102 is configured to receive inputs from a user and/or to present visual information for the user. In one embodiment, the user device 102 is configured to receive an input from a user to initiate instructions for correcting a hanging thread situation that cannot be identified and corrected by the system 100. The user device 102 may be configured to receive inputs from a user using a mouse, a keyboard, a touchpad, a touch screen, buttons, sliders, and/or any other suitable type of user input device. In one embodiment, the user device 102 comprises a display unit for presenting information to a user. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. For example, the display unit may be the display of a tablet or smart phone.

Application server 104 represents any appropriate combination of hardware, controlling logic, and data for providing devices access to data or information. For example, application server 104 may represent a networked server or collection of networked servers capable of communicating with other elements of system 100. In some embodiments, application server 104 may execute any suitable operating system such as IBM's zSeries/Operating system (z/OS), MS-DOS, PC-DOS, MAC-OS, WINDOWS, UNIX, OPenVMS, Linux, or any other appropriate operating systems, including operating systems developed in the future. The functions of application server 104 may be performed by any suitable combination of one or more servers or other components at one or more locations. In the embodiment where the modules are servers, the servers may be public or private servers, and each server may be a virtual or physical server. The server may include one or more servers at the same or at locations remote from one another.

In certain embodiments, application server 104 includes a processor 110, a network interface 112, and a memory 114.

Processor 110 communicatively couples to network interface 112 and memory 114. Processor 110 controls the operation and administration of application server 104 by processing information received from network interface 112 and memory 114. Processor 110 includes any hardware and/or software that operates to control and process information. Processor 110 may be a programmable logic device, a microcontroller, a microprocessor, any suitable processing device, or any suitable combination of the preceding. For example, the processor 110 may be 8-bit, 16-bit, 32-bit, 64-bit or of any other suitable architecture.

Network interface 112 represents any suitable device operable to receive information from network 108, perform suitable processing of the information, communicate to other devices, or any combination of the preceding. Network interface 112 represents any port or connection, real or virtual, including any suitable hardware and/or software, including protocol conversion and data processing capabilities, to communicate through a LAN, WAN, or other communication systems that allows application server 104 to exchange information with the other components of system 100.

Memory 114 stores, either permanently or temporarily, data, operational software, or other information for processor 110. Memory 114 includes any one or a combination of volatile or nonvolatile local or remote devices suitable for storing information. For example, memory 114 may include random access memory (RAM), read only memory (ROM), magnetic storage devices, optical storage devices, or any other suitable information storage device or a combination of these devices. While illustrated as including particular modules, memory 114 may include any suitable information for use in the operation of application server 104.

In certain embodiments, memory 114 includes Java virtual machine 116, a plurality of Java applications 118, a thread healing engine 120, a heuristics repository 124, and a plurality of thread healing scripts 122. Java virtual machine 116 is a software program that executes the Java applications 118 and provides a runtime environment for the Java applications 118. Applications 118 represent any software applications written in the Java programming language. Alternate embodiments may utilize different virtual machines and programming languages. For example, alternate embodiments may use the .NET Framework.

Generally, thread healing engine 120 monitors the system performance of application server 104 and records performance metrics. For example, thread healing engine 120 can monitor the CPU usage metrics of application server 104. A plurality of different parameters may be monitored, some of which will be discussed in more detail with respect to FIGS. 2 and 3. Thread healing engine 120 is further configured to detect when a thread running on application server 104 becomes stuck. Additional details regarding the detection of stuck threads is provided with respect to FIG. 2.

Once a stuck thread is detected, the thread healing engine 120 compares the system performance metrics as they were recorded at the time the thread became stuck with data stored in heuristics repository 124 to identify the most likely cause of the stuck thread. In some embodiments this requires a perfect match between the system performance metrics as they were recorded at the time the thread became stuck and one of the scenarios stored in heuristics repository 124. In other embodiments, identifying the most likely cause of the stuck thread involves selecting from the heuristics repository 124 the closest match between the system performance metrics as they were recorded at the time the thread became stuck and one of the scenarios stored in heuristics repository 124.

Heuristics repository 124 contains a collection of previous stuck thread scenarios and associates each scenario with a healing script 122 that, when executed, may fix the stuck thread. After finding a scenario of the closest match in the heuristics database, the thread healing engine 120 sends the selected healing script 122 to processor 110 for execution. Additional details on the operation of thread healing engine 120, including examples of stuck thread scenarios and the healing scripts 122 that may correct such scenarios, are provided with respect to FIGS. 2 and 3.

While the heuristics repository 124, healing scripts 122, and thread healing engine 120 are described as residing on the memory 114 of application server 104, alternative embodiments might store these items on a remote memory. Further embodiments might also execute thread healing engine 120 and healing scripts 122 on a processor that is remote from application server 104.

Database server 106 generally includes datasets that may be fed to the Java applications 118 on application server 104. In certain embodiments, database server 106 comprises a processor 126, a memory 128, and a network interface 130. Processor 126 communicatively couples to network interface 130 and memory 128. Processor 126 controls the operation and administration of database server 106 by processing information received from network interface 130 and memory 128. Processor 126 includes any hardware and/or software that operates to control and process information. Processor 126 may be a programmable logic device, a microcontroller, a microprocessor, any suitable processing device, or any suitable combination of the preceding. For example, the processor 126 may be 8-bit, 16-bit, 32-bit, 64-bit or of any other suitable architecture.

As illustrated, network interface 130 represents any suitable device operable to receive information from network 108, perform suitable processing of the information, communicate to other devices, or any combination of the preceding. Network interface 130 represents any port or connection, real or virtual, including any suitable hardware and/or software, including protocol conversion and data processing capabilities, to communicate through a LAN, WAN, or other communication systems that allows database server 106 to exchange information with the other components of system 100.

In some embodiments, memory 128 is configured to store data for use by Java applications 118. The type of data stored will vary with the type of Java application 118. Various data structures may be employed to suit the needs of a given Java application 118. Memory 128 stores, either permanently or temporarily, data, operational software, or other information for processor 126 and for java applications 118. Memory 128 includes any one or a combination of volatile or nonvolatile local or remote devices suitable for storing information. For example, memory 128 may include random access memory (RAM), read only memory (ROM), magnetic storage devices, optical storage devices, or any other suitable information storage device or a combination of these devices.

Network 108 allows communication between and amongst the various components of system 100. Network 108 may be any suitable network operable to facilitate communication between the components of system 100. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The operation of an example system 100 may be better understood by reference to FIGS. 2 and 3. In FIG. 2, method 200 illustrates a method for detecting and correcting hanging threads using a system such as that illustrated in FIG. 1. At step 202, the thread healing engine 120 monitors a plurality of system parameters 204 related to the operation of application server 104 by taking snapshots of the values for each parameter 204. Monitoring may be continuous or periodic. Users of system 100 may select the frequency at which thread healing engine 120 monitors the system parameters 204. In some embodiments, the monitored parameters 204 include CPU utilization 206, garbage collection 208, storage 210, database password expiry 212, disk operation 214, file system 216, I/O usage 218, database long run query 220, memory 222, threads 224, power outage 226, database down 228, heap memory 230, network 232, and database lock 234.

FIG. 3 illustrates example snapshots. In FIG. 3, application 302, which represents an embodiment of a java application 118, has threads 304, 306, and 308 running. Snapshots 310, 312, 314, 316, and 318 of the system parameters 204 were taken at one-minute intervals, and have timestamps 320, 322, 324, 326, and 328, respectively. The snapshots 310, 312, 314, 316, and 318 each have measurements for CPU utilization 206, garbage collection 208, storage 210, database password expiry 212, disk operation 214, file system 216, I/O usage 218, database long run query 220, memory 222, threads 224, power outage 226, database down 228, heap memory 230, network 232, and database lock 234.

The CPU utilization 206 parameter includes measurements of user processes, system processes, CPU clock speed, and CPU idle time for each thread. The garbage collection 208 parameter includes measurements of the application suspension time caused by a garbage collection algorithm. The storage 210 parameter measures the utilization of storage on the application server 104. The database password expiry 212 indicates whether passwords related to data stored in database server 106 are valid or expired. The disk operation 214 parameter measures disk utilization, disk I/O speed, disk access errors, partition access errors, and disk queue length. The file system 216 parameter measures errors in file system read and write operations. The I/O usage 218 parameter measures I/O throughput. The database long run query 220, database down 228, and database lock 234 are all parameters related to the performance of database server 106. Each one represents an error in the database operation and is monitored by measuring a database connectivity test result, a database load test result, or a database heartbeat. The memory 222 and heap memory 230 parameters measure available virtual memory, available physical memory, the number of pages processed per second, and page faults. The threads 224 parameter tracks the number and nature of the currently running threads. The power outage 226 parameter measures the power levels received by application server 104. The network 232 parameter measures Network Interface Card (NIC) health status, routing, ping, and tracert status.

Alternate embodiments may select different aspects of the performance of application server 104 to measure for each parameter 204. Additionally, alternate embodiments may focus on fewer parameters 204 or they may include additional parameters 204.

As depicted in FIG. 3, the measurements are indicated as normal or exceeding a threshold. The applicable threshold for each parameter 204 may be defined through application base lining practices. Alternate embodiments may record numerical values for the measurements made in each category in the snapshot rather than just record whether a threshold was exceeded.

Returning to FIG. 2 and proceeding to step 236, the thread healing engine 120 detects a stuck thread. Detection may occur, for example, by determining that a thread was performing a request for longer than an established time limit. Once it is determined that a thread is stuck, thread healing engine 120 proceeds to step 238 where it reviews a series of the snapshots taken before the stuck thread was detected and identifies the first snapshot in the series with an anomaly. Users of system 100 may establish the number of snapshots to review.

FIG. 3 illustrates steps 236 and 238. A stuck thread was detected at the time snapshot 318 was recorded. At step 238, in this example, the thread healing engine 120 reviews the four snapshots taken before the stuck thread was detected. Of the four snapshots, the first anomaly—an exceeded threshold for the CPU utilization parameter 206—is detected at snapshot 312. Returning to FIG. 2, the thread healing engine 120 advances to step 240 where it compares the set of parameter states in snapshot 312 with prior stuck thread scenarios stored in heuristics repository 124. This comparison is a search for a closest match. Because each parameter 204 can be affected by several different factors, the match may occur at two levels. First, thread healing engine 120 may search for a match between the combination of normal and abnormal states of parameters 204 in snapshot 312 with a prior stuck thread scenario in heuristics repository 124. Next, it may search for matches between specific values within each parameter 204, rather than merely whether the value exceeds a threshold or not, and a prior stuck thread scenario in heuristics repository 124.

If, at step 242, a closest match is found, the thread healing engine 120 proceeds to step 244 to take appropriate action as described by a thread healing script 122 that is associated with the matched stuck thread scenario in the heuristics repository 124. In this example, the thread healing script 122 entails analyzing the currently running threads and killing the thread that is tagged as lower priority. Other thread healing scripts 122 may call for a thread to be stalled, put to sleep, or prioritized over other threads depending on the stuck thread scenario and the types of threads that are running.

Anomalies in other parameters 204 may necessitate running different healing scripts 122. For example, anomalies in the garbage collection 208, memory 222, and heap memory 230 parameters may require running a thread healing script 122 that kills, stalls, sleeps, or initiates garbage collection. Such anomalies may run a thread healing script 122 that prioritizes or deprioritizes threads that are currently running. Anomalies in the storage 210, file system 216, and disk operation 214 parameters may necessitate a thread healing script 122 that cleans, archives, moves, or deletes data. Such anomalies may alternatively require running a thread healing script 122 that prioritizes or deprioritizes threads that are currently running. Anomalies in the database down 228, database lock 234, and database long run query 220 parameters may necessitate a thread healing script 122 that restores a known configuration, activates a fallback cluster, clears a temp, reconfigures defaults, or induces a waiting period until the abnormal parameter is cleared. Anomalies in the network 232 parameter may necessitate a thread healing script 122 that kills, stalls, puts to sleep, or otherwise prioritizes I/O throughput on threads running on application server 104.

Following execution of a thread healing script 122, thread healing engine 120 advances to step 246 where it continues to monitor the parameters 204 for the duration of a timeout timer. At step 248, if the thread is no longer stuck when the timeout timer expires, the thread healing engine 120 proceeds to step 250 where it updates the heuristics repository 124 with an indication of the stuck thread scenario that was fixed and the thread healing script 122 that was used to fix it.

If, however, it is determined at step 248 that the thread is still stuck, the thread healing engine 120 proceeds to step 252 to identify the next possible use case scenario by reviewing the set of snapshots reviewed at step 238 to find the second snapshot with a detected anomaly. In the example of FIG. 3, the second detected anomaly—an exceeded threshold in the storage parameter 210—occurs in snapshot 316. Thread healing engine 120 proceeds to step 240 where it compares the set of parameter states in snapshot 316 with prior stuck thread scenarios stored in heuristics repository 124. If a closest match is found at step 242, then thread healing engine 120 proceeds to step 244 as described above. If, however, a closest match is not found at step 242, thread healing engine 120 proceeds to step 254 where a user is engaged to make a manual intervention. In one embodiment, this is achieved by transmitting a signal to the user device 102 of system 100 that can be displayed visually or audibly to a user.

After a user is notified that intervention is necessary, the user will take appropriate action at step 256. Appropriate action includes diagnosing the cause of the stuck thread and writing a thread healing script 122 that will fix the stuck thread. Various diagnostic techniques may be employed to probe the performance of application server 104. There may be multiple solutions to a given stuck thread scenario. One of ordinary skill in the art would also appreciate there are numerous ways to write a script for implementing each solution. After drafting a script to fix the identified stuck thread issue, the drafted thread healing script 122 is executed by the application server 104 and saved to memory 114.

Following resolution of the stuck thread issue by a user at step 256, the thread healing engine 120 proceeds to step 258 where it updates the heuristics repository 124 with the snapshot of parameters 204 that was recorded when the stuck thread was detected and links the saved snapshot to the copy of the thread healing script 122 that is saved to memory 114.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the claim.

What is claimed is:

1. A system for correcting stuck thread scenarios on an application server, comprising:
    an application server running one or more threads;
    a memory configured to store snapshots of the system performance of the application server that are taken at periodic time intervals, wherein the snapshots include the status of a plurality of server performance parameters, a repository of previous stuck thread scenarios, wherein the stuck thread scenario comprises the snapshot of the system performance taken when the thread has been working on a request for more than a configured maximum time, and a plurality of scripts, each comprising a set of instructions for resolving one of the stuck thread scenarios;
    a hardware processor communicatively coupled to the memory, the hardware processor configured to:
    monitor the plurality of server performance parameters;
    determine that a thread running on the application server is stuck when it has been working on a request for more than a configured maximum time;
    retrieve, from the memory, a set of snapshots of the system performance taken during a period of time preceding the moment when it was determined that the thread running on the application server is stuck;
    identify from among the retrieved set of snapshots the oldest snapshot with a server performance parameter that exceeds a threshold;
    compare the server performance parameters comprising the oldest snapshot with the repository of previous stuck thread scenarios to identify a closest match;
    identify a script with the instructions for resolving the matched stuck thread scenario; and
    execute the identified script.

2. The system of claim 1, wherein the hardware processor is further configured to:
    wait a predetermined amount of time;
    determine that the thread running on the application server is still stuck;
    identify from among the retrieved set of snapshots the second oldest snapshot with a server parameter that exceeds a threshold, the parameter that exceeds the threshold in the identified second oldest snapshot being a different parameter from the parameter that exceeds the threshold in the identified oldest snapshot.

3. The system of claim 2, wherein the hardware processor is further configured to:
    compare the server performance parameters comprising the identified second oldest snapshot with the repository of previous stuck thread scenarios to identify a closest match;
    identify a script with the instructions for resolving the matched stuck thread scenario; and
    execute the identified script.

4. The system of claim 2, wherein the hardware processor is further configured to:
    compare the server performance parameters comprising the identified second oldest snapshot with the repository of previous stuck thread scenarios to determine that there is no match;
    alert a user of the system that manual intervention is required.

5. The system of claim 4, further comprising:
    a user device, communicatively coupled to the hardware processor, that is configured to
    receive the alert that manual intervention is required;
    display the alert to a user;
    receive user input in the form of a script that corrects the stuck thread;
    send, to the memory, the script for correcting the stuck thread;
    and wherein the hardware processor is further configured to execute the script sent by the user device.

6. The system of claim 1, wherein the monitored parameters include at least one selected from the group of CPU utilization, memory utilization, disk utilization, disk I/O speed, disk que length, database connectivity test result, database load test, database heartbeat, I/O throughput, bytes I/O, Network Interface Card (NIC) health status, ping, tracert status, power status.

7. The system of claim 1, wherein the identified script comprises instructions to terminate the stuck thread if the stuck thread is a task of lower priority than the other currently running threads.

8. A method for correcting stuck thread scenarios on an application server, comprising:
    taking, by a hardware processor communicatively coupled to a memory, snapshots of an application server's performance parameters at periodic time intervals, wherein the snapshots include the status of a plurality of performance parameters;
    determining, by the hardware processor, that a thread running on the application server is stuck when it has been working on a request for more than a configured maximum time;
    retrieving, by the hardware processor, a set of snapshots, from the memory, of the system performance taken during a period of time preceding the moment when it was determined that the thread running on the application server is stuck;
    identifying, by the hardware processor, from among the retrieved set of snapshots the oldest snapshot with a performance parameter that exceeds a threshold;
    comparing, by the hardware processor, the server performance parameters comprising the oldest snapshot with a repository of previous stuck thread scenarios, wherein the stuck thread scenario comprises the snapshot of the system performance taken when the thread has been working on a request for more than a configured maximum time, to identify a closest match
    identifying, by the hardware processor, a script with the instructions for resolving the matched stuck thread scenario from a database of solutions to the previous stuck thread scenarios; and
    executing, by the hardware processor, the identified script.

9. The method of claim 8, further comprising:
    waiting, by the hardware processor, a predetermined amount of time;

determining, by the hardware processor, that the thread running on the application server is still stuck;

identifying, by the hardware processor, the second oldest snapshot with a server parameter that exceeds a threshold from among the retrieved set of snapshots, the parameter that exceeds the threshold in the identified second snapshot being a different parameter from the parameter that exceeds the threshold in the identified oldest snapshot.

10. The method of claim 9, further comprising:

comparing, by the hardware processor, the server performance parameters comprising the identified second snapshot with the repository of previous stuck thread scenarios to identify a closest match;

identifying, by the hardware processor, a script from a database of solutions to the previous stuck thread scenarios with the instructions for resolving the matched stuck thread scenario;

executing, by the hardware processor, the identified script.

11. The method of claim 9, further comprising:

comparing, by the hardware processor, the server performance parameters comprising the identified second snapshot with the repository of previous stuck thread scenarios to determine that there is no match;

alerting, by the hardware processor, a user of the system that manual intervention is required.

12. The method of claim 11, wherein alerting a user of the system that manual intervention is required comprises displaying an alert on a screen of a user device.

13. The method of claim 8, wherein the performance parameters include at least one selected from the group of CPU utilization, memory utilization, disk utilization, disk I/O speed, disk que length, database connectivity test result, database load test, database heartbeat, I/O throughput, bytes I/O, Network Interface Card (NIC) health status, ping, tracert status, power status.

14. The method of claim 8, wherein the identified script comprises instructions to terminate the stuck thread if the stuck thread is a task of lower priority than the other currently running threads.

15. An apparatus for correcting stuck thread scenarios on an application server, comprising:

a memory operable to store:

snapshots of an application server's performance that are taken at periodic intervals, wherein the snapshots include a status of a plurality of server performance parameters;

a repository of previous stuck thread scenarios, wherein a stuck thread scenario comprises the snapshot of the system performance taken when the thread has been working on a request for more than a configured maximum time;

and a plurality of scripts, each comprising a set of instructions for resolving one of the stuck thread scenarios;

a hardware processor communicatively coupled to the memory, the hardware processor configured to:

monitor the plurality of server performance parameters;

determine that a thread running on the application server is stuck when it has been working on a request for more than a configured maximum time;

retrieve, from the memory, a set of snapshots of the system performance taken for a period of time preceding the moment when it was determined that the thread running on the application server is stuck;

identify from among the retrieved set of snapshots the oldest snapshot with a server parameter that exceeds a threshold;

compare the server performance parameters comprising the oldest snapshot with the repository of previous stuck thread scenarios to identify a closest match;

identify a script with the instructions for resolving the matched stuck thread scenario; and execute the identified script.

16. The apparatus of claim 15, wherein the hardware processor is further configured to:

wait a predetermined amount of time;

determine that the thread running on the application server is still stuck;

identify from among the retrieved set of snapshots the second oldest snapshot with a server parameter that exceeds a threshold, the parameter that exceeds the threshold in the identified second oldest snapshot being a different parameter from the parameter that exceeds the threshold in the identified oldest snapshot.

17. The apparatus of claim 16, wherein the hardware processor is further configured to:

compare the server performance parameters comprising the identified second oldest snapshot with the repository of previous stuck thread scenarios to identify a closest match;

identify a script with the instructions for resolving the matched stuck thread scenario; and execute the identified script.

18. The apparatus of claim 16, wherein the hardware processor is further configured to:

compare the server performance parameters comprising the identified second oldest snapshot with the repository of previous stuck thread scenarios to determine that there is no match;

alert a user of the system that manual intervention is required.

19. The apparatus of claim 18, wherein the hardware processor is configured to alert a user of the system that manual intervention is required by displaying the alert on the screen of a user device.

20. The apparatus of claim 15, wherein the identified script comprises instructions to terminate the stuck thread if the stuck thread is a task of lower priority than the other currently running threads.

* * * * *